Sept. 15, 1970     K. B. HARMON ET AL     3,528,321
MULTIPLE TURBINE CONVERTER AND PLANETARY GEAR ARRANGEMENT
Filed Feb. 25, 1969     2 Sheets-Sheet 1

INVENTORS.
*Kenneth B. Harmon,*
*Robert E. Nelson, &*
*Robert K. Sanders*
*A. M. Heiter*
ATTORNEY Sept. 15, 1970     K. B. HARMON ET AL     3,528,321
MULTIPLE TURBINE CONVERTER AND PLANETARY GEAR ARRANGEMENT
Filed Feb. 25, 1969     2 Sheets-Sheet 2

INVENTORS.
Kenneth B. Harmon,
Robert E. Nelson, &
Robert K. Sanders

ATTORNEY

United States Patent Office 3,528,321
Patented Sept. 15, 1970

3,528,321
MULTIPLE TURBINE CONVERTER AND
PLANETARY GEAR ARRANGEMENT
Kenneth B. Harmon and Robert E. Nelson, Indianapolis,
and Robert K. Sanders, Whitestown, Ind., assignors to
General Motors Corporation, Detroit, Mich., a corporation of Delaware
Filed Feb. 25, 1969, Ser. No. 802,057
Int. Cl. F16h 47/08
U.S. Cl. 74—677
9 Claims

ABSTRACT OF THE DISCLOSURE

A torque converter and planetary gearing arrangement is disclosed in which one turbine is drivingly connected to the output member of the gearing and the output shaft of the transmission, a second turbine is drivingly connected to the input reaction member of the gearing and the pump member is selectively connectable through a clutch to the input member of the gearing. The second turbine rotates opposite to the pump at low speed ratios, is stationary at an intermediate speed ratio and rotates in the same direction as the pump at high speed ratios. The planetary gear ratio is so designed that when the second turbine is stationary, the input member of the planetary gearing and the pump are rotating at equal speeds thus permitting the clutch to be engaged with a zero speed differential between the components to be clutched. When the clutch is engaged, a split power path is established with a portion of the power being transmitted mechanically from input to output and the remainder of the power being transmitted through both turbines of the torque converter from input to output.

---

Figure 1:
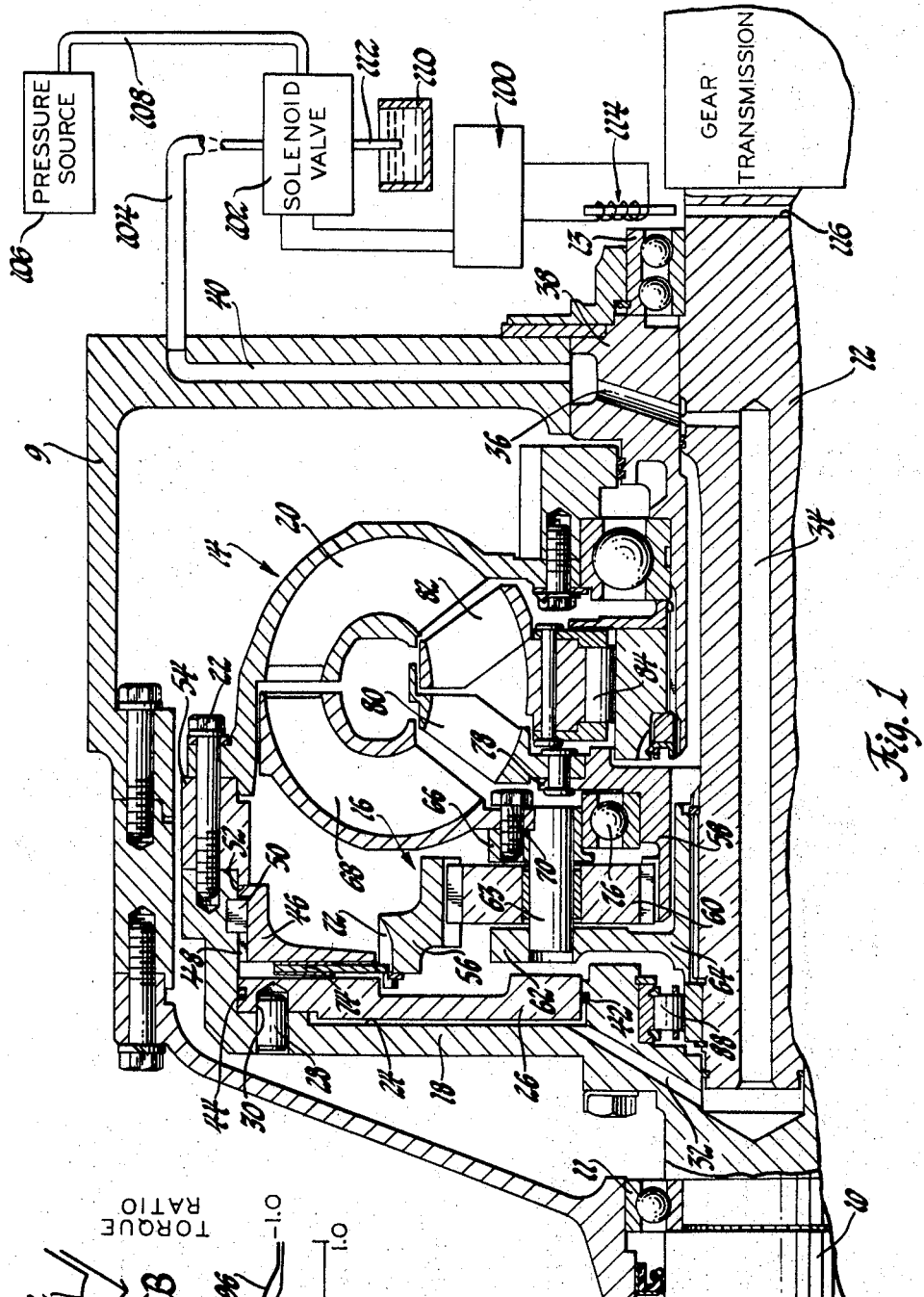

This invention relates to power transmissions and more particularly to power transmissions wherein a torque converter, planetary gearing and a clutch provide a fluid drive and a split power drive.

In most power transmissions where a lockup clutch is used, to increase the efficiency of the transmission, the lockup clutch is operable to directly connect the input and output members of the torque converter. While such a system does improve the efficiency of the transmission, it has disadvantages in some applications and most particularly in crawler type vehicles. These vehicles generally are operated at very low speeds and encounter many sudden load increases. When the conventional lockup system is used, the load increase is quite often rapid enough to stall the engine before the lockup clutch can be disengaged. The present invention overcomes this disadvantage by retaining the torque converter in the transmission power path during lockup operation. Thus, the torque converter absorbs the transient loads without severely lugging the engine. The torque converter also dampens the engine torsional vibrations which in conventional lockup systems would be transmitted to the output through the lockup clutch.

The present invention also provides an increase in efficiency over conventional torque converter transmission where a lockup clutch is not employed since a portion of the engine power is transmitted to the output shaft mechanically.

In the present invention, the output of the transmission is continuously driven by the input of the transmission through the torque converter and is selectively driven through a clutch and a planetary gear set, in parallel with the torque converter. The planetary gear set and torque converter are so designed that the speed ratio of the planetary gear set, between the ring gear connectable to the input and the carrier connected to the output, is the same as the speed ratio of the torque converter when the clutch is being engaged. Thus, there is no relative movement between the components of the clutch during engagement.

During operation of the vehicle, the driver may encounter conditions in which it is desirable to maintain the clutch engaged or disengaged. Also, it is desirable to provide a hysteresis between engagement and disengagement of the clutch to prevent "hunting." To provide these features a control system is employed which permits the operator to select, within a range, the output speed at which clutch engagement occurs. The control also permits the operator to select the downshift hysteresis range in which he desires to operate.

It is an object of this invention to provide in an improved transmission a torque converter and a planetary gear set operatively connectable in parallel between the input and output to provide simultaneous hydraulic and mechanical power paths.

Another object of this invention is to provide in an improved transmission, a torque converter and a planetary gear set selectively operatively connectable in parallel between the transmission input and output to provide a mechanical power path for increased efficiency and a hydraulic power path to dampen transient load conditions.

Another object of this invention is to provide in a transmission a torque converter having an input driven member, and first and second output driving members and a planetary gear set having an output member connected to the first driving member, a reaction input member drivingly connected to the second driving member and an input member selectively drivingly connectable, through a clutch, to the driven member.

A further object of this invention is to provide in a transmission having a torque converter and a clutch selectively connectable between the transmission input and output members, a control for varying the engagement of the clutch relative to output speed and for varying the hysteresis between engagement and disengagement.

Figure 2:
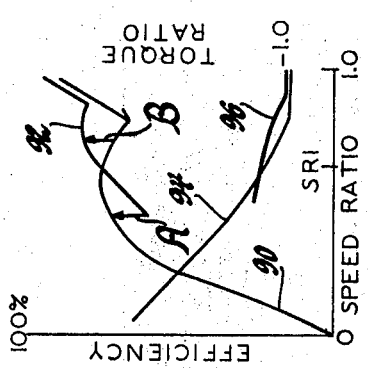
Figure 3:
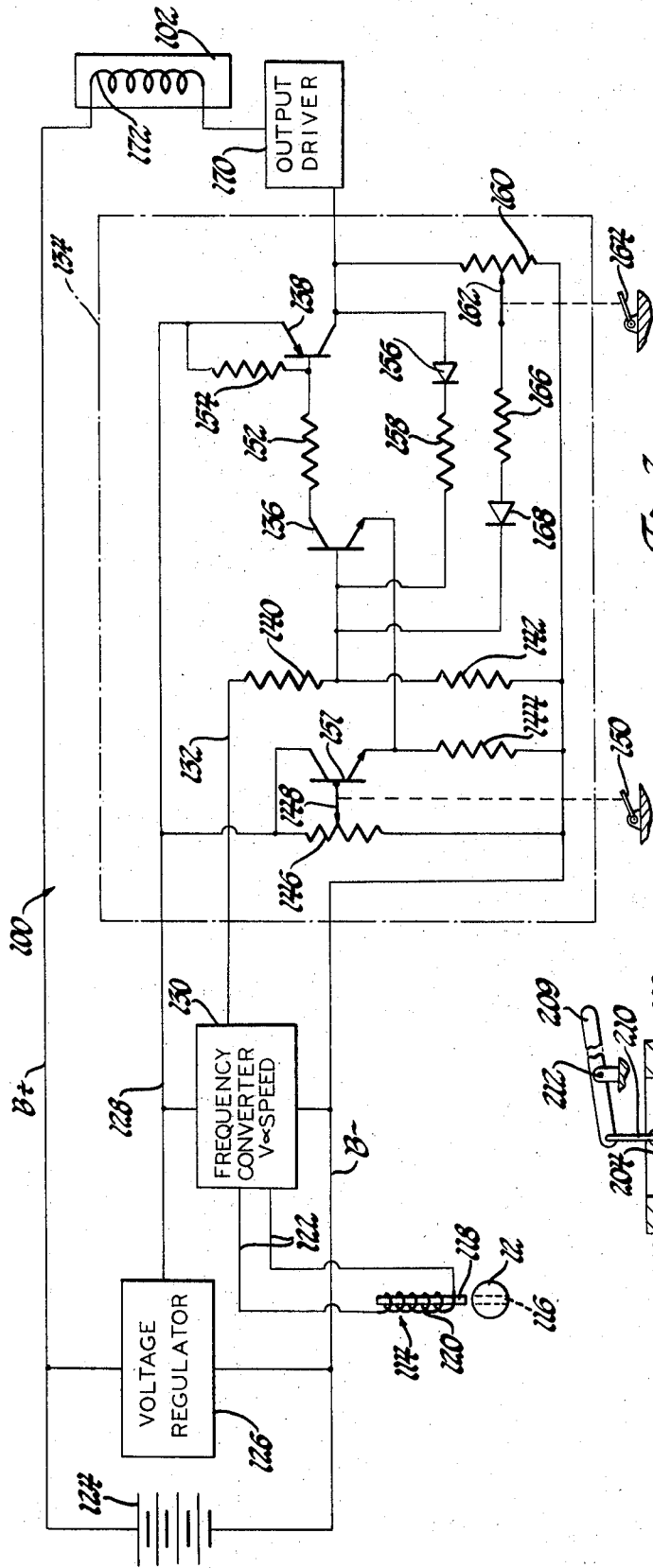
Figure 4:
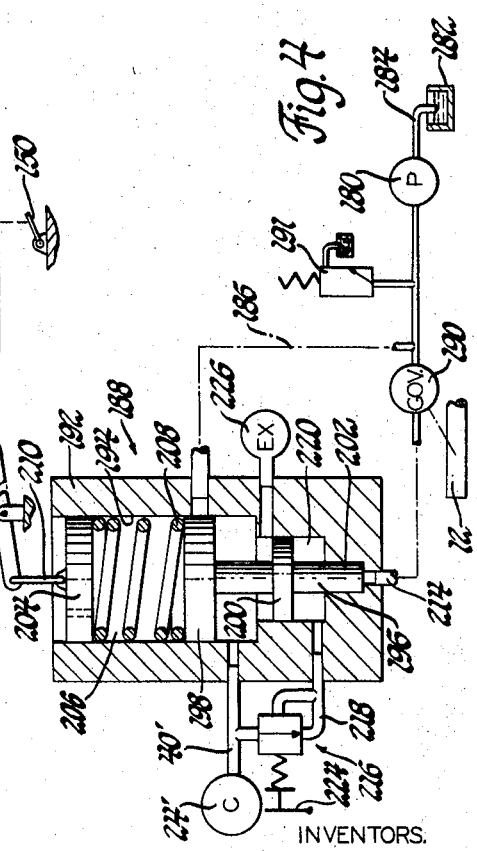

These and other objects and advantages will become more apparent from the following description and drawing in which: FIG. 1 is a cross-sectional elevation view of the transmission, FIG. 2 is a performance curve for the transmission, FIG. 3 is a schematic drawing of an electrical control for the transmission, and FIG. 4 is a schematic drawing of a hydraulic control for the transmission.

Referring to the drawings and particularly FIG. 1, there is shown a transmission having a stationary housing 9, an input shaft 10 rotatably mounted in the housing 9 by a bearing 11, an output shaft 12 rotatably mounted in the housing 9 by a bearing 13, a multiple turbine torque converter 14 and a planetary gear set 16. The input shaft 10 has an annular drum extension 18 which is secured to the impeller 20 of the torque converter 14 with a plurality of fasteners 22. The drum 18 has a fluid chamber 24 in which is slidably mounted an annular piston 26 which cooperates with the chamber 24 to form a fluid motor. A pin member 28 is secured in the drum 18 and slidably located in a bore 30 of the piston 26 to prevent relative rotation between the piston 26 and the input shaft 10. Fluid pressure is admitted to the chamber 24 to move the piston 26 axially relative to the drum 18 via passage 32 in the input shaft 10, passage 34 in the output shaft 12, passage 36 in a stator support 38 which is secured to the housing 9, and passage 40 in the stationary transmission housing 9. A pair of sealing rings 42 and 44 are located at the inner and outer diameters of the piston 26 to prevent fluid leakage from the chamber 24. A backup plate 46 is drivingly connected to the drum 18 by a spline 48 and a key 50. Rightward axial movement of the backup plate 46 is limited by a shoulder 52 on an annular suspension ring 54.

The planetary set 16 includes a ring gear 56, a sun gear 58, a plurality of planet pinions 60 meshing with the sun gear 58 and the ring gear 56 and a planet carrier 62 which rotatably supports the planet pinions 60 on pins 63. The planet carrier 62 is supported by and drivingly connected to the output shaft 12 by the central hub 64. The carrier 62 also has an annular flange member 66 which is secured to the first turbine 68 of the torque converter 14 by a plurality of fasteners 70 thus providing a drive connection between the first turbine 68 and the output shaft 12.

The ring gear 56 has a spline 72 at its outer diameter to which is drivingly connected an annular friction clutch disc 74, which extends between the piston 26 and the backup plate 46 such that when fluid pressure is admitted to chamber 24, a friction drive connection between the input shaft 10 and the ring gear 56 is provided. The sun gear 58 is rotatably supported on the carrier 62 by a ball bearing 76 and has an annular flange 78 to which is secured the second turbine 80 of the torque converter 14.

The torque converter 14 also has a stator member 82 which is operatively connected through a one-way brake 84 to the stator support 38. The one-way brake 84 prevents reverse rotation of the stator 82 during torque converter operation but permits forward rotation of the stator 82 during fluid coupling operations.

In operation, the impeller 20 is driven by the input shaft 10 so that fluid energy is transmitted from the impeller 20 to the first turbine 68 thereby causing the first turbine 68, the carrier 62 and the output shaft 12 to rotate forwardly in the same direction as the input shaft 10. During low speed ratios in the torque converter 14, the fluid leaving the first turbine 68 imparts reverse drive to the second turbine 80 and the sun gear 58. The fluid leaving the second turbine 80 is redirected by a stator 82 to the impeller 20. With the clutch disengaged and the sun gear 58 rotating in reverse, the ring gear 56 is free to rotate forwardly. The forward speed of the ring gear 56 is determined by the number of teeth on the sun gear 58 and the ring gear 56, the speed of the sun gear 58 and the speed of the carrier 62. As the forward speed of the first turbine 68 increases, the rearward speed of the second turbine 80 decreases, until a predetermined speed ratio is reached at which time the second turbine 80 will be stationary. With the second turbine 80 stationary, the sun gear 58 is established as a reaction member for the planetary gear set 16. By properly selecting the number of teeth on the sun gear 58 and the ring gear 56, the ring gear speed will be equal to the speed of the input shaft 10 when the second turbine 80 is stationary. Since the ring gear speed and input shaft speed are equal, the clutch piston 26 can be engaged with no speed differential between the friction plate 74 and the piston 26. After the clutch is engaged, and the first turbine 68 continues to increase in speed, the second turbine 80 is driven forwardly by the fluid leaving the first turbine 68. Thus a portion of the power transmitted from the input shaft 10 and the output shaft 12 is hydraulic through the first and second turbines 68 and 80 and the remainder is mechanical to the clutch plate 74 and the ring gear 56.

A roller bearing 88 is located between the input shaft 10 and the output shaft 12. The function of the bearing 88 is to provide support for the left end of the output shaft 12.

The curves shown in FIG. 2 represent the efficiency and torque ratio between the input shaft 10 and the output shaft 12 for various speed ratios in the torque converter 14. The curve 90 is the efficiency obtained using the torque converter alone; that is, the clutch is not engaged and the curve 92 represents the efficiency when the clutch is engaged. It is seen from these curves that a higher efficiency is obtained above the speed ratio SR1 when the clutch is engaged. SR1 is the speed ratio at which the ring gear 56 is rotating at a speed equal to the input shaft 10 and is, therefore, the speed ratio at which the clutch is engaged. The curve 94 represents the torque ratio between the input shaft 10 and the output shaft 12 due to the torque converter alone and the curve 96 represents the torque ratio when the clutch is engaged to provide a split power transmission. If a transient or sudden load should be imposed on the output shaft 12, the load change would be absorbed by the torque converter without lugging the engine.

When the torque converter and the planetary gearing are operated on curve 90 to the SR1 point and then on curve 92, the maximum performance and economy is obtained. This is especially desirable when the vehicle is to be driven for some distance, such as on a highway, between a loading point and a dumping point. Under certain conditions, however, the operator may desire to maintain the clutch engaged below the SR1 point or disengaged above the SR1 point in the range between arrows A and B thus preventing excessive clutch operation and rapid changes in efficiency that occurs at the clutch point. When the vehicle is being operated on rough terrain and the output shaft speed is low, it is desirable to maintain the clutch disengaged during momentary speed increases above the SR1 point to prevent an excessive number of shifts. If the vehicle is working on fairly flat terrain and the output shaft speed is high, it is desirable to maintain the clutch engaged during momentary speed decreases below the SR1 to reduce the number of shifts. By reducing the number of shifts which occur, the clutch life is increased.

To prevent "hunting" of the clutch, a hysteresis between engagement and disengagement is provided so that disengagement is always accomplished at a low speed than engagement. The amount of speed differential or hysteresis is also controllable by the operator.

To control admission of fluid pressure to the passage 40 for operation of the piston 26, an electrical control circuit 100 is provided. The control circuit 100 operates a solenoid valve 102 selectively connecting the passage 40 through a conduit 104 to a source of fluid pressure 106 by way of a conduit 108 or to a sump 110 by way of a conduit 112. A variable reluctance electromagnetic pickup 114 arranged to sense rotational speed of the output shaft 12 provides an input to the control circuit 100. The pickup 114 is located adjacent the output shaft 12 which has a hole 116 drilled diametrically therethrough. As shown in FIG. 3, the pickup 114 includes a core 118 of magnetic material surrounded by a coil 120. As the output shaft 12 rotates, the pickup 114 senses each passage of the hole 116 and accordingly produces an output pulse on leads 122 which are connected to the control circuit 100. Thus the frequency of the pulses on the leads 122 will be proportional to the output shaft speed.

The electrical control circuit 100 includes a 24 volt battery 124 having its positive terminal connected to a power supply line B+ and its negative terminal connected to a power supply line B—. A voltage regulator 126 is connected across the supply lines B+ and B— and produces a regulated 18 volt output on line 128. An electronic frequency converter 130 has power supplied thereto by connection with the lines 128 and B—. The leads 122 from the pickup 114 are connected to the frequency converter 130 to provide a signal input. The frequency converter 130 then produces on an output line 132 a linear DC voltage proportional to the frequency of the pulses on line 122 and therefore proportional to the output shaft speed.

A comparator circuit 134 includes switching transistors 136 and 138. The line 132 is connected to line B— through a voltage dropping resistor 140 and a biasing resistor 142. The junction of the resistors 140 and 142 is connected to the base of the transistor 136 and the emitter of the transistor 136 is connected to line B+ through a biasing resistor 144. A variable voltage dividing resistor 146 is connected between the lines 128 and B— and has a sliding center tap 148 connected to a manual control 150 for manual adjustment. The center tap 148 is connected to the base of a transistor 151 which has its collector connected to the line 128 and its emitter connected to the resistor 144. The voltage drop across the resistor 144 may be varied by adjusting the position of the center tap 148 to control the emitter current of the transistor 151. Therefore, a manually adjustable bias voltage on the emitter of transistor 136 is provided.

The collector of the transistor 136 is connected through a resistor 152 to the base of the transistor 138. The emitter of the transistor 138 is connected to the line 128 and a resistor 154 is connected between the line 128 and the base of the transistor 138. A first regenerative feedback circuit comprises a diode 156 and a resistor 158 connected between the collector of the transistor 138 and the base of the transistor 136. When the transistors 136 and 138 turn on, current is supplied through this first feedback circuit and through the bias resistor 142 to increase the voltage on the base of the transistor 136 thereby effecting fast switching of the transistors 136 and 138 and providing hysteresis so that to turn off the transistor 136, the voltage on the line 132 must be lower than the voltage required to turn on the transistor 136. A second feedback circuit includes a variable resistor 160 connected between the collector of the transistor 138 and the line B—. A sliding center tap 162 on the resistor 160 is adjustable by a manual control 164. The center tap 162 is connected through a resistor 166 and a diode 168 to the base of the transistor 136. Thus the second feedback circuit provides additional hysteresis according to the amount manually set by the control 164.

The collector of the transistor 138 is connected to an output driver 170 which controls current flow through a solenoid 172 which forms a part of the solenoid valve 102. The solenoid 172 has one side connected to the line B+ and the other side connected to the output driver. The output driver in turn has a connection to the line B+ so that when the output line 170 is energized, the solenoid 172 will be connected to the line B—.

In operation, when the voltage on the line 132 reaches the shift point established by the setting of the adjustable center tap 148, the base voltage on the transistor 136 exceeds the emitter voltage to turn that transistor on. The collecor current of the transistor 136 flowing through the resistor 154 lowers the voltage on the base of the transistor 138 to turn that transistor on which in turn energizes the output driver 170 and effects energization of the solenoid 172 to actuate the solenoid valve 102 and supply fluid pressure to the piston 26. When the output shaft speed falls below the upshift point by an amount determined by the feedback current through the diodes 156 and 158, the voltage on the base of the transistor 136 will fall below its emitter voltage to turn off that transistor and the voltage of the line 128 will be supplied to the base of the transistor 138 by the resistor 154 to turn off that transistor to deenergize the output driver 170 and the solenoid 172 allowing the solenoid valve 102 to return to its normal position to connect the passage 40 to the sump 110 thereby removing pressure from the piston 26.

As an example, the component values of the control circuit 100 may be selected so that the upshift point will occur between 1500 and 1650 r.p.m. of the output shaft as determined by the setting of the manual control 150 and the amount of hysteresis between the upshift and downshift point will be adjustable between 250 r.p.m. (established by the current flow through the diode 156) and 800 r.p.m. as established by the setting of the manual control 164.

A hydraulic control may also be provided to control the engagement and disengagement of the clutch. FIG. 4 is a diagrammatic representation of such a control. Referring to the drawing, there is shown a hydraulic circuit including an engine driven pump 180 which receives fluid from the reservoir 182 through a main passage 184 and delivers the fluid by a main passage 186 to clutch control valve 188 and an output driven governor 190. A conventional pressure regulator valve 191 establishes the pressure in main passage 186.

The clutch control valve 188 includes a valve body 192 having a multi-stepped valve bore 194 and a valve spool 196 having three progressively smaller diameter valve lands 198, 200 and 202 respectively slidably disposed in the bore 194. A spring seat 204 is slidably disposed in the large diameter of valve 194 and cooperates with the valve land 198 to form a spring chamber 206 for a compression spring 208. The spring seat 204 is connected to an operator lever 209 by a link 210. The operator lever 209 is pivotally mounted at a point 212 and is movable by the operator to vary the spring load which the spring 208 transmits to the valve land 198.

The governor 190 is of conventional design and is driven by the output shaft 12 to provide a pressure signal proportional to output shaft speed in a governor passage 214. The governor passage 214 is in fluid communication with the smallest diameter of valve bore 194 so that the governor signal provides a bias force on the end of land 202 which opposes the force stored in the spring 208.

The clutch apply chamber 24' is in fluid communication with the clutch control valve 188 through clutch apply passage 40' which is connected to valve bore 194 between lands 198 and 200. The clutch passage 40' is also connected to a conventional variable pressure reducing valve 216 which is in fluid communication via passage 218 to the intermediate diameter of valve bore 194, which diameter cooperates with valve land 200 to form a variable pressure bias chamber 220. The pressure bias in chamber 220 acts on the differential area between lands 200 and 202 thus establishing an upward force on the valve spool 196 in opposition to the force on spring 208. The pressure setting of pressure reducing valve 216 is manually controlled by the operator through an operator lever 224 to control the pressure in passage 218 whenever the clutch passage 40' is pressurized.

In the downshifted position shown, the clutch passage 40' and apply chamber 24' are open between lands 198 and 200 to an exhaust passage 226 thus maintaining the clutch disengaged while the main passage 186 is closed by valve land 198. However, when the governor pressure in the passage 214 reaches a level sufficient to overcome the force in spring 208 to move the valve spool 192 upward, the clutch passage 40' is open to main passage 186 between lands 198 and 200 so that the clutch is engaged while the exhaust passage 226 is closed by land 200. When the valve spool 196 is in the upshifted position, the clutch pressure in passage 40' acts on the differential area between lands 198 and 200 to provide a hysteresis force in opposition to the spring force. At the same time fluid pressure controlled by the reducing valve 216 develops in chamber 220 to provide a second hysteresis force. This second hysteresis force is variable to permit the operator to control the speed differential between engagement and disengagement of the clutch.

Thus, the upshift speed is manually controlled through the lever 209 which controls the force in spring 208 and the downshift speed is controlled by the operator through the lever 224 which sets the pressure level of the reducing valve 216. A minimum hysteresis between upshift and downshift speeds is provided by the clutch apply pressure operating on the differential area between valve lands 198 and 200.

We wish it to be understood that we do not desire to be limited to the exact details of construction shown and described, for obvious modifications will occur to a person skilled in the art.

What is claimed is:

1. A torque converter and gearing arrangement including input means; output means; planetary gear means having an input member, an output member drivingly connected to said output means and an input-reaction member; a pump member driven by said input means; a first turbine member in fluid communication with said pump member and drivingly connected to said output means; a second turbine member in fluid communication with said pump and first turbine members, drivingly connected to said input-reaction member and rotating opposite to said pump member during a first phase, being stationary during a second phase, and rotating in the same direction as said pump member during a third phase; and clutch means selectively operable to drivingly connect said input means and said input member when said second turbine is in the second phase.

2. The invention defined in claim 1 further including clutch control means for controlling the engagement and disengagement of said clutch means having pressure source means; valve means operatively connected between said source means and said clutch means and being movable to an open and a closed position; speed signal generating means operatively connected to said clutch control means for providing a speed signal thereto to effect movment of said valve means to said open position at a determinable speed value; and hysteresis means operatively connected to said valve control means for maintaining said valve means in the open position when the speed signal is decreased below the determinable speed value.

3. The invention defined in claim 2 and said control means including operator means for establishing the determinable speed value.

4. The invention defined in claim 2 and said speed signal generating means including electromagnetic pickup means adjacent said output shaft for sensing rotation thereof and for providing a pulse signal at a frequency proportional to the rotation of said shaft, and frequency converter means operatively connected to said electromagnetic pickup for providing a voltage signal to said clutch control means proportional to the frequency of the pulse signals; said clutch control means including first switching transistor means, second switching transistor means operatively connected between the first switching transistor means and the valve means for controlling the engagement and disengagement of the clutch means, manually operable variable resistance means operatively connected to the first switching transistor to control the switching point thereof for establishing said determinable speed value to thereby effect engagement of the clutch means; and said hysteresis means including manually operable hysteresis variable resistance means operatively connected to said first and second switching transistor means for effecting switch of both transistor means to cause disengagement of the clutch means at a determinable speed decrease below the determinable speed value.

5. A power transmission including input means; output means; torque converter means for providing a fluid drive between said input and output means including a pump element drivingly connected to said input means, a first turbine drivingly connected to said output means and a second turbine; clutch means selectively operatively connectable with said input means; and planetary gear means for selectively providing a mechanical drive between said input and output means simultaneously with the fluid drive including a plurality of members drivingly connected to said first turbine, said second turbine and said clutch means.

6. The invention defined in claim 5 and said power transmission including control means having shift valve means movable to an upshifted and a downshifted position for controlling the engagement and disengagement of said clutch means, manual upshift control means operatively connected to said shift valve means for establishing a plurality of upshift speed values; manually controlled downshift means operatively connected to said shift valve means for providing a plurality of downshift hysteresis values; and speed signal generating means operative in response to the speed of said output means for providing a speed signal to said valve means.

7. In a transmission an input shaft; an output shaft; a torque converter including an impeller driven by said input shaft, a first turbine drivingly connected to said output shaft, and a second turbine rotating opposite to said impeller in a first phase, stationary in a second phase, and rotating in the same direction as the impeller in a third phase; a planetary gear unit including a sun gear drivingly connected to said second turbine and rotating therewith, a ring gear, a plurality of planet pinions meshing with said sun and ring gear, and a carrier member rotatably supporting said planet pinions and drivingly connected to said first turbine and said output shaft; and selectively engageable clutch means operatively connectable between said input shaft and said ring gear.

8. In a power transmission an input member; an output shaft; torque converter means for providing a fluid drive between said input member and said output shaft including an impeller drivingly connected to said input member, a first turbine drivingly connected to said output shaft, and a second turbine; clutch means selectively operatively connectable with said input member; and planetary gear means for selectively providing a mechanical drive between said input member and said output shaft simultaneous with the fluid drive of said torque converter means when said clutch means is engaged including a sun gear drivingly connected to said second turbine, a ring gear operatively connected to said clutch means, a plurality of pinions meshing with said sun and ring gears, and a carrier member rotatably supporting said pinions and being drivingly connected to said first turbine and said output shaft.

9. The invention defined in claim 8 and said power transmission including shift control means for controlling the engagement and disengagement of said clutch means; governor means for providing a speed signal to said shift control means; manually operated upshift control means for providing a plurality of upshift settings for said shift control means; and manually controlled downshift hysteresis means for providing a plurality of downshift hysteresis settings for said shift control means.

References Cited
UNITED STATES PATENTS

| | | | |
|---|---|---|---|
| 2,911,852 | 11/1959 | Russell | 74—688 X |
| 3,041,892 | 7/1962 | Schjolin | 74—688 X |
| 3,217,563 | 11/1965 | Simpson | 74—688 |
| 3,425,295 | 2/1969 | Galaniuk | 74—688 X |
| 3,025,719 | 3/1962 | Kelley et al. | 74—677 |
| 3,073,182 | 1/1963 | Harmon | 74—677 |

ARTHUR T. McKEON, Primary Examiner

U.S. Cl. X.R.

74—688

PO-1050
(5/69)

UNITED STATES PATENT OFFICE
CERTIFICATE OF CORRECTION

Patent No. 3,528,321　　　　　　　　Dated September 15, 1970

Inventor(s) Kenneth B. Harmon, Robert E. Nelson, Robert K. Sanders

It is certified that error appears in the above-identified patent and that said Letters Patent are hereby corrected as shown below:

Column 4, line 34, "low" should read -- lower -- ;

Column 5, line 65, "1500" should read -- 1400 -- .

SIGNED AND
SEALED
NOV 24 1970

(SEAL)
Attest:

Edward M. Fletcher, Jr.
Attesting Officer

WILLIAM E. SCHUYLER, JR.
Commissioner of Patents